(12) United States Patent
Ramirez Muela et al.

(10) Patent No.: US 10,452,038 B2
(45) Date of Patent: Oct. 22, 2019

(54) BUILD MATERIAL PROFILE

(71) Applicants: HEWLETT-PACKARD DEVELOPMENT COMPANY, L.P., Houston, TX (US); David Ramirez Muela, Barcelona (ES); Sergio Puigardeu Aramendia, Barcelona (ES); Pol Fornos, Barcelona (ES); Salvador Sanchez Ribes, Sabadell (ES)

(72) Inventors: David Ramirez Muela, Barcelona (ES); Sergio Puigardeu Aramendia, Barcelona (ES); Pol Fornos, Barcelona (ES); Salvador Sanchez Ribes, Sabadell (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 460 days.

(21) Appl. No.: 15/111,731

(22) PCT Filed: Sep. 30, 2014

(86) PCT No.: PCT/EP2014/070968
§ 371 (c)(1),
(2) Date: Jul. 14, 2016

(87) PCT Pub. No.: WO2015/106844
PCT Pub. Date: Jul. 23, 2015

(65) Prior Publication Data
US 2016/0332376 A1      Nov. 17, 2016

(30) Foreign Application Priority Data

Jan. 16, 2014   (WO) ................ PCT/EP2014/050841

(51) Int. Cl.
*B33Y 10/00*     (2015.01)
*G05B 15/02*     (2006.01)
(Continued)

(52) U.S. Cl.
CPC .............. *G05B 15/02* (2013.01); *B29C 64/00* (2017.08); *B29C 64/165* (2017.08); *B29C 64/35* (2017.08);
(Continued)

(58) Field of Classification Search
CPC .......... B33Y 10/00; B33Y 30/00; B33Y 50/02
See application file for complete search history.

(56) References Cited

U.S. PATENT DOCUMENTS

| 4,430,012 A | 2/1984 | Kooy et al. |
| 5,696,690 A | 12/1997 | Richardson et al. |

(Continued)

FOREIGN PATENT DOCUMENTS

| CN | 102950770 A | 3/2013 |
| CN | 103429075 A | 12/2013 |

(Continued)

OTHER PUBLICATIONS

European Patent Office, International Search Report and Written Opinion for PCT/EP2014/070968 dated Jan. 20, 2015 (15 pages).
(Continued)

*Primary Examiner* — Vincent H Tran
(74) *Attorney, Agent, or Firm* — HP Inc. Patent Department (57) ABSTRACT

Examples are described that generate control data (280) for production of a three-dimensional object. Build material profile data (260) is accessed for an indicated build material. The build material profile data for a given build material defines one or more parameter values that are dependent on the properties of the given build material and that are configured to generate a three-dimensional object with predefined build properties. Certain examples are arranged to
(Continued)

generate control data for the production of a three-dimensional object by applying build material profile data to received object data (230).

25 Claims, 4 Drawing Sheets (51) Int. Cl.
*B33Y 30/00* (2015.01)
*B33Y 50/02* (2015.01)
*B33Y 70/00* (2015.01)
*G05B 19/19* (2006.01)
*B29C 64/00* (2017.01)
*B29C 64/165* (2017.01)
*B29C 64/386* (2017.01)
*B29C 64/40* (2017.01)
*B29C 64/35* (2017.01)
*B29K 101/12* (2006.01)
*B29K 105/00* (2006.01)

(52) U.S. Cl.
CPC ............ *B29C 64/386* (2017.08); *B29C 64/40* (2017.08); *B33Y 10/00* (2014.12); *B33Y 30/00* (2014.12); *B33Y 50/02* (2014.12); *B33Y 70/00* (2014.12); *G05B 19/19* (2013.01); *B29K 2101/12* (2013.01); *B29K 2105/251* (2013.01); *B29K 2995/004* (2013.01); *G05B 2219/49023* (2013.01)

(56) References Cited

U.S. PATENT DOCUMENTS

| | | | |
|---|---|---|---|
| 5,784,956 A | 7/1998 | Walz | |
| 6,663,712 B2 | 12/2003 | Doyle et al. | |
| 6,799,959 B1 | 10/2004 | Tochimoto et al. | |
| 6,948,901 B2 | 9/2005 | Allemann | |
| 7,680,555 B2 | 3/2010 | Dunn et al. | |
| 7,722,151 B2 | 5/2010 | Elenes et al. | |
| 8,798,780 B2 | 8/2014 | Menchik et al. | |
| 2002/0145213 A1* | 10/2002 | Liu | G03G 15/224 264/40.1 |
| 2005/0001356 A1 | 1/2005 | Tochimoto et al. | |
| 2006/0091199 A1 | 5/2006 | Loughran et al. | |
| 2010/0191360 A1 | 7/2010 | Napadensky et al. | |
| 2010/0327479 A1* | 12/2010 | Zinniel | B29C 48/05 264/172.14 |
| 2013/0053995 A1 | 2/2013 | Hashimoto | |
| 2013/0073068 A1* | 3/2013 | Napadensky | G06T 17/00 700/98 |
| 2013/0088554 A1 | 4/2013 | Veis | |
| 2013/0328228 A1* | 12/2013 | Pettis | F16M 11/12 264/40.1 |
| 2014/0203479 A1* | 7/2014 | Teken | B33Y 10/00 264/401 |
| 2015/0091208 A1* | 4/2015 | Sadusk | B29C 64/00 264/308 |
| 2015/0210010 A1* | 7/2015 | Napadensky | G06T 17/00 428/195.1 |
| 2015/0269290 A1* | 9/2015 | Nelaturi | G06F 17/5009 703/6 |

FOREIGN PATENT DOCUMENTS

| | | |
|---|---|---|
| EP | 1452298 | 9/2004 |
| EP | 1613480 | 11/2007 |
| JP | 2001150556 | 6/2001 |
| JP | 2002-292748 | 10/2002 |
| JP | 2005503939 | 2/2005 |
| JP | 2007219628 | 8/2007 |
| JP | 2012101532 | 5/2012 |
| JP | 2012-515668 | 7/2012 |
| WO | WO-2001038061 A1 | 5/2001 |
| WO | WO-2006091842 | 8/2006 |
| WO | WO-2008151063 | 12/2008 |
| WO | WO-2009013751 | 1/2009 |
| WO | WO-2012085914 | 6/2012 |
| WO | WO-2013/030064 | 3/2013 |
| WO | WO-2013113372 | 8/2013 |

OTHER PUBLICATIONS

European Patent Office, International Search Report for PCT/EP2014/050841 dated Sep. 25, 2014 (4 pages).
https://exploreideasdaily.wordpress.com/tag/additive-manufacturing/—Additive Manufacturing—An Idea per Day—A blog on 3D Printing, 3D Scanning and other loosely related topics, May 20, 2013 (13 pages).

* cited by examiner

BUILD MATERIAL PROFILE

BACKGROUND

Additive manufacturing systems that generate three-dimensional objects on a layer-by-layer basis have been proposed as a potentially convenient way to produce three-dimensional objects in small quantities. These systems typically receive a definition of the three-dimensional object in the form of an object model. This object model is processed to instruct an additive manufacturing system to produce the object using one or more build materials. There are many different types of additive manufacturing system. The processing of the object model may vary based on the type of additive manufacturing system.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details of certain examples are set forth. Reference in the specification to "an example", "a case" or similar language means that a particular feature, structure, or characteristic described in connection with the example is included in at least that one example or in at least one potential implementation of that example, but not necessarily in other examples or all possible implementations of that example.

Certain additive manufacturing systems are used to generate three-dimensional objects through the solidification of at least one build material. The properties of the resulting three-dimensional objects depend on the build materials used and the properties of those build materials. The resulting object properties may also be dependent upon additional factors such as the method of solidification used and the external environment and conditions. Consequently, these systems may require careful calibration, and potentially recalibration, to achieve a desired set of properties in a three-dimensional object to be produced.

Certain examples described herein are presented with reference to additive manufacturing systems that use a "layer-by-layer" approach where a build material is deposited on a platform and a solidification process is applied to each layer before the next layer of build material is applied.

A three-dimensional object to be created may be designed in a computer aided design (CAD) package which defines object data for an object or portion of an object. Object data associated with an object or portion of an object may comprise design properties such as the overall three-dimensional shape of the object and also surface properties such as color, smoothness and opacity. In certain cases, object data may also comprise desired and/or required material properties of the object to be produced, for example mechanical properties such as density, stress, strength and elastic properties, thermal and electrical conductivity properties and numerous further additional material properties.

Certain examples described herein provide a build material profile for use in an additive manufacturing system. In these examples a build material used in an additive process has its own set of parameters that may be used to achieve nominal values of a set of desired properties in the resultant three-dimensional object. The parameters may be used together with object data received for a given object to generate suitable control data for the production of the object. In certain examples, an additive manufacturing system operating under optimal control parameters as set by one or more build material profiles provides a stable build process when using one or more selected build materials.

Figures 1A, 1B:
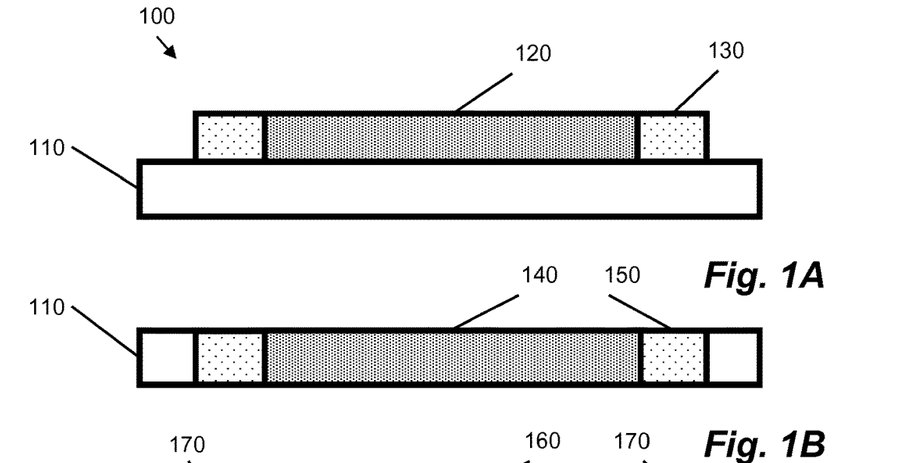
FIGS. 1A to 1C are schematic illustrations of a process for building a layer of a three-dimensional object according to an example.
Figure 1C:
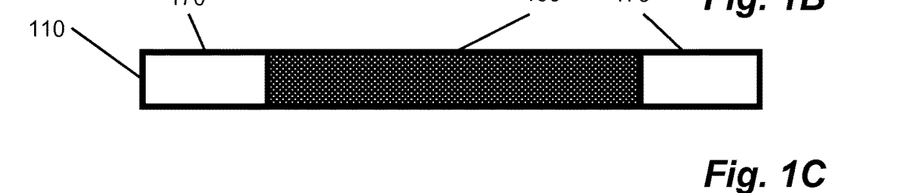

A process of generating a three-dimensional object according to an example will now be described with reference to FIGS. 1A to 1C. FIGS. 1A to 1C, relate to an example additive manufacturing system that uses a coalescing agent and a coalescence modifier agent. These agents allow a three-dimensional object to have varying material properties. Although a particular additive manufacturing system is presented as an example, the examples described below may be applied to other additive manufacturing systems. These include, amongst others, selective laser sintering systems, stereo lithography systems, inkjet systems, any three-dimensional printing systems, inkjet deposition systems, and laminated object manufacturing systems.

In the examples described herein, a coalescing agent is any substance that is configured to be applied to portions of a build material and, on application of energy to the deposited fluid, coalesce said portions. In one case a coalescing agent may comprise an energy absorber, such as an ultra-violet, visible light and/or infra-red energy absorber. As such, deposit of a coalescing agent may cause certain portions of a build material to absorb energy from an energy source. This in turn may heat up said portions to a temperature above the melting point of the build material, causing the build material to coalesce, e.g. fuse.

Likewise, a coalescence modifier agent is any substance that acts to modify the effects of a coalescing agent. For example, the coalescing agent and coalescence modifier agent may be selected such that: i) portions of build material on which no coalescing agent have been delivered do not coalesce when energy is temporarily applied thereto; ii) portions of build material on which only coalescing agent has been delivered or has penetrated do coalesce when energy is temporarily applied; iii) portions of build material on which only coalescence modifier agent has been delivered or has penetrated do not coalesce when energy is temporarily applied thereto; and iv) portions of build material on which both coalescing agent and coalescence modifier agent have been delivered or have penetrated may undergo a modified degree of coalescence. The coalescence modifier agent may utilise different physical and/or chemical effects to modify the effects of a coalescing agent. The coalescence modifier agent may reduce the degree of coalescence or increase the degree of coalescence depending on the nature of a selected agent.

FIGS. 1A to 1C shows a series 100 of cross-sections of a layer of a selected build material according to one example. For simplicity, the example is described in relation to a single build material, however the process may be extended to a plurality of build materials. In FIG. 1A, a first layer of build material 110 is provided on a suitable support member (not shown). In one example the thickness of the layer of build material provided is in the range of about 90 to 110 microns, although in other examples thinner or thicker layers of build material may be provided. The example of FIGS. 1A to 1C uses a coalescing agent 120 and a coalescence modifier agent 130 that are selectively delivered to one or more portions of the surface of the layer 110 of build material. The selective delivery of the agents 120 and 130 is performed in accordance with control data for the layer. This control data may be control data as generated by the examples described below. By selective delivery is meant that both coalescing agent and coalescence modifier agent may be delivered to selected portions of the surface layer of the build material in respective independent patterns. These patterns may be determined by the control data.

In one case the coalescing agent 120 may comprise a black colorant, such as an ink-type formulation comprising carbon black. The coalescence modifier agent 130 may comprise any agent that prevents the build material solidifying. For example, it may comprise: a liquid that comprises solids; a salt solution; a fluid that exhibits a suitable cooling effect; a suitable plasticizer; or a surface tension modifier. The layer 110 may comprise one or more build materials. These may include powdered semi-crystalline thermoplastic materials. They may also comprise powdered metal materials, powdered composited materials, powder ceramic materials, powdered glass materials, powdered resin material, powdered polymer materials, and the like.

FIG. 1B shows that the agents 120 and 130 delivered to the surface of the build material penetrate into the layer 110 of build material, for example at locations 140 and 150. The degree to which the agents penetrate may differ between the two different agents, or may be substantially the same in some examples. In some examples, the degree of penetration may vary depending on the configuration of the additive manufacturing system.

Following the penetration of the agents 120 and 130 into the layer 110, a predetermined level of energy is temporarily applied. In one example, the energy applied is infra-red or near infra-red energy, although in other examples other types of energy may be applied, such as microwave energy, ultra-violet (UV) light, halogen light, ultra-sonic energy or the like. The length of time the energy source is applied and/or the type of energy source may vary depending on the configuration of the additive manufacturing system. The temporary application of energy causes portions of the build material on which the coalescing agent has been delivered or has penetrated, e.g. portions 140, to heat up above the melting point of the build material and to coalesce. Upon cooling, the portions which have coalesced become solid and form part of the three-dimensional object being generated. One such portion is shown as portion 160 in FIG. 1C. In the present example, the portions of the build material on which coalescence modifier agent has been delivered or has penetrated, e.g. portions 150, do not coalesce following application of the energy source. This may help reduce the effects of lateral coalescence bleed. This may be used, for example, to improve the definition or accuracy of object edges or surfaces, and/or to reduce surface roughness. In another example, the coalescence modifier agent may be delivered interspersed with the coalescing agent which may be used to enable object properties to be modified. The process shown in FIGS. 1A to 1C may be repeated for subsequent layers of build material associated with subsequent planes or z-slices of a three-dimensional model, e.g. a three-dimensional model defined by object data as described above.

Figure 2:
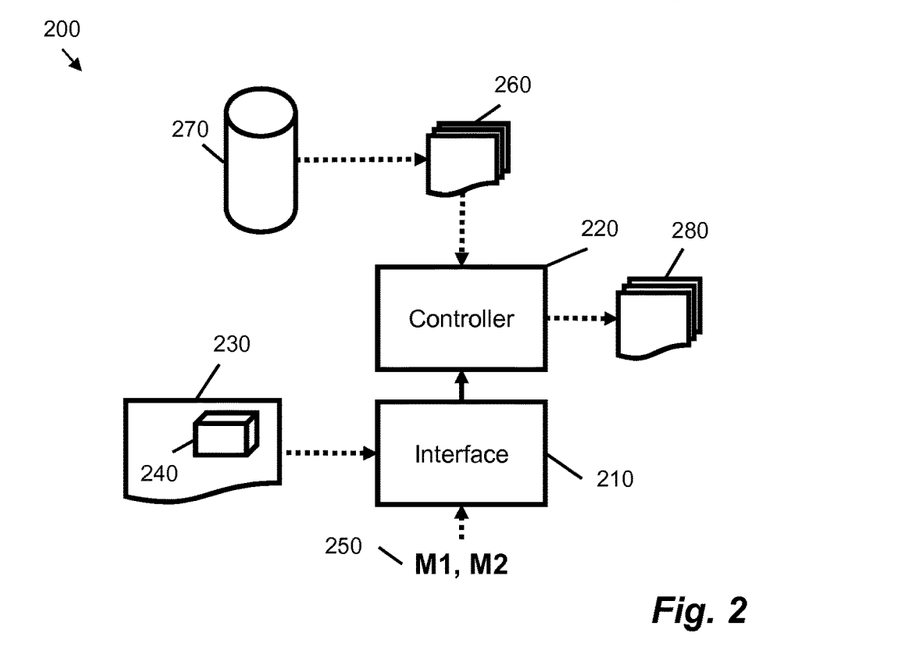
FIG. 2 is a simplified schematic diagram showing an apparatus for generating control data for production of a three-dimensional object according to an example.

FIG. 2 shows a schematic diagram, according to an example, of an apparatus 200 for generating control data for production of a three-dimensional object. In FIG. 2, the apparatus 200 comprises an interface 210, and a controller 220 communicative coupled to the interface 210.

The interface 210 is arranged to receive, or obtain, object data 230 for a three-dimensional object to be generated. In the example of FIG. 2 the object data 230 comprises at least object model data 240. The object model data 240 may define a three-dimensional model of at least a portion of the object to be generated. The model may define the shape and extent of the object in a three-dimensional co-ordinate system, e.g. the solid portions of the object. The object model data 240 may be generated by a computer aided design (CAD) application.

In the example of FIG. 2, the interface 210 is also arranged to receive, or obtain, selection data 250 indicating at least one build material to be used to generate the three-dimensional object. In one case, the selection data 250 may form part of the object data 230, for example it may be specified in association with the object model data 240. In another case, the selection data 250 may be received from an additive manufacturing system that is arranged to produce the three-dimensional object; for example, the selection data 250 may indicate one or more build materials that are available to the additive manufacturing system. In another case, the selection data 250 may be received from a user interface; for example, a user may select, via the user interface, a particular build material for production of the object. In certain cases, the aforementioned sources of selection data may be combined; for example, a user may select a subset of available build materials and/or a mapping may be performed between one or more build materials indicated in object data 230 and one or more available build materials.

In the example of FIG. 2, the controller 220 is arranged to access build material profile data 260 relating to one or more build materials. In FIG. 2, build material profile data 260 is retrieved for the build materials indicated in the received selection data 250. The build material profile data 260 defines one or more parameter values that are dependent on the properties of a given build material and that are configured to generate a three-dimensional object with predefined build properties. Build material profile data 260 may be accessed in the form of one or more computer files; for example, each available build material may have a separate computer file comprising build material profile data. In another case, build material profile data 260 may be available in a database, such as a remote or local database, wherein the selection data is used to retrieve one or more parameter values stored in fields associated with a particular build material record.

In the example of FIG. 2, the build material profile data 260 is accessed from a storage device 270. In one example, the storage device 270 is locally coupled to the controller 220, for example it may comprise memory or a hard disk drive accessible to the controller 220. In other examples, build material profile data 260 may be accessed remotely, for example over a network. In this case, a remote application programming interface may be used to return one or more parameter values in response to a remote request comprising an identifier for a given build material, for example a build material within selection data 250. Build material profile data 260 may be supplied by the manufacturer of the additive manufacturing system and/or one or more suppliers of build material. In one case, build material profile data 260 may be editable, for example a technician may edit parameter values for a given build material based on a configuration of a particular additive manufacturing system.

In FIG. 2, the controller 220 is arranged to generate control data 280 for the production of a three-dimensional object by applying the accessed build material profile data 260 to the received object data 230. This may comprise determining image and/or layer processing techniques based on one or more of the accessed build material profile data 260 and the received object data 230. For example, a parameter value for a thickness of a layer of selected build material may be retrieved from the build material profile data 260 and used to construct appropriate z-axis slices of object model data 240. Similarly, when using the process illustrated in FIGS. 1A to 1C parameter values relating to amounts of one or more of a coalescing agent and a coalescence modifier agent may be retrieved from the build material profile data 260 of a selected build material and used, in combination with one or more z-axis slices from the object model data 240, to generate instructions for the deposition of said agents on one or more layers of build material. In one example, the build material profile data 260 may provide parameter values used to configure the additive manufacturing system to produce the three-dimensional object; for example, it may provide parameter values that are used to set one or more of, amongst others, operating temperatures, applied energy quantities, fusing power and speed of deposit (e.g. of one or more of build materials and agents). Such a configuration of an additive manufacturing system may be instructed by the control data 280. A given additive manufacturing system may be arranged to receive the control data 280 and automatically configure the system for production of the object.

When the apparatus of FIG. 2 is used to generate control data 280 to instruct the process shown in FIGS. 1A to 1C, build material profile data 260 for a selected build material may comprise at least one parameter value relating to an interaction of a coalescence modifier agent and the selected build material, the coalescence modifier agent being used to modify coalescence of the selected build material in the production of the three-dimensional object. For example, the parameter value may relate to one or more of: a quantity of the coalescence modifier agent to be used for a unit volume of the selected build material; a radius of coalescence modifier agent to be used for the selected build material; a gradient profile to be applied to the radius of coalescence modifier agent; a quantity of uncoalesced build material to be used in a build material mix for the selected build material; a number of passes for the distribution of at least the coalescence modifier agent for a layer of the selected build material; and a temperature to be applied to one or more uncoalesced areas of a layer of the selected build material. In one case, the one or more parameter values may comprise both a quantity of a coalescing agent to be used for a unit volume of the selected build material, e.g. to be used per object part unit volume, and a quantity of the coalescence modifier agent to be used for a unit volume of the selected build material, e.g. to be used per object part unit volume. The one or more parameter values may also be used to configure the fusing and crystallization temperature of the additive manufacturing system. These values may differ for different materials.

As the energy required to trigger a phase change in a given build material, e.g. to enable coalescing, may differ from material to material, the use of build material profile data 260 to set the operating configuration of an additive manufacturing system enables appropriate parameters to be automatically set via the control data 280, leading to successful object production. Three-dimensional objects may also be generated that meet one or more predetermined object properties, e.g. one or more design, mechanical and/or surface properties. For example, the interaction between a coalescence modifier agent and a given build material may be measured and used to determine one or more operating parameter values for a selected additive manufacturing system that result in generated three-dimensional objects that meet one or more predetermined object properties. For example, desired build stability and/or part properties may be assured, e.g. defects such as curl, warping and/or deficient layer deposition may be avoided and/or minimized to acceptable thresholds.

In one case, an additive manufacturing system may have a number of operational modes. In this case, build material profile data for a given build material may comprise sets of parameter values that are selected for a particular operational mode. For example, operational modes may be defined that optimize one or more of cosmetic appearance of a generated object, dimensional accuracy of a generated object and throughput of the additive manufacturing system (e.g. the number of objects that may be produced in a given time period). In these cases the build material profile data may comprise sets of parameter values respectively optimized for cosmetic appearance, dimensional accuracy and throughput. When an operational mode is selected, for example by a user or automatically based on production parameters, then the appropriate parameter values for that mode may be retrieved from the build material profile data and applied to configure the additive manufacturing system. As such an additive manufacturing system may produce an object with a given build material in a variety of ways, wherein in each case the required data for configuration is provided by the build material profile data.

According to one example, build material may be re-used. For example, build material 170 that does not form part of coalesced portion 160 in FIG. 1C may be collected and used to form a subsequent layer of build material. In these cases the unused build material may comprise a quantity of a coalescence modifier agent, e.g. portions 170 previously absorbed coalescence modifier agent as shown in portions 150 of FIG. 1B. Portions 170 also comprise portions of build material where no agent has been deposited, whether that agent be a coalescing agent or a coalescence modifier agent. As such, following the production of a three-dimensional object with multiple layers of coalesced and uncoalesced build material, e.g. layers similar to that shown in FIG. 1C, the uncoalesced build material may be removed to leave the coalesced build material, which has the form of the three-dimensional object. In these cases, the uncoalesced build material, which may comprise one or more of build material where no agent has been deposited and build material where coalescence modifier agent has been deposited, may be collected for re-use as build material in the generation of a subsequent object.

For example, uncoalesced build material may be mixed with "pure" or "new" build material to form a build material mix. This build material mix may be used as the build material in the generation of a subsequent object. In such a case, the resulting build material composition may have different properties. To ensure there is not a degradation in the quality of the build, the controller 220 may be arranged to configure the control data 280 for a subsequent build based on a proportion of unused to used build material, i.e. the proportion of "new" to "recycled" build material in a build material mix. For example, parameters values from build material profile data 260 may be modified to account for the reuse of build material, e.g. settings may be configured based on the amount of reused build material. A function used to modify the parameter values may be stored by the controller 220 and/or defined in the build material profile data 260. Alternatively, a set of one or more parameter values may be provided in the build material profile data 260 that are associated with one or more proportions of reused build material in a build material mix. In one case, at least an amount of coalescing agent and an amount of coalescence modifier agent to be used in the subsequent layers of an object may be modified based on the feedback and the build material profile data 260.

Figure 3:
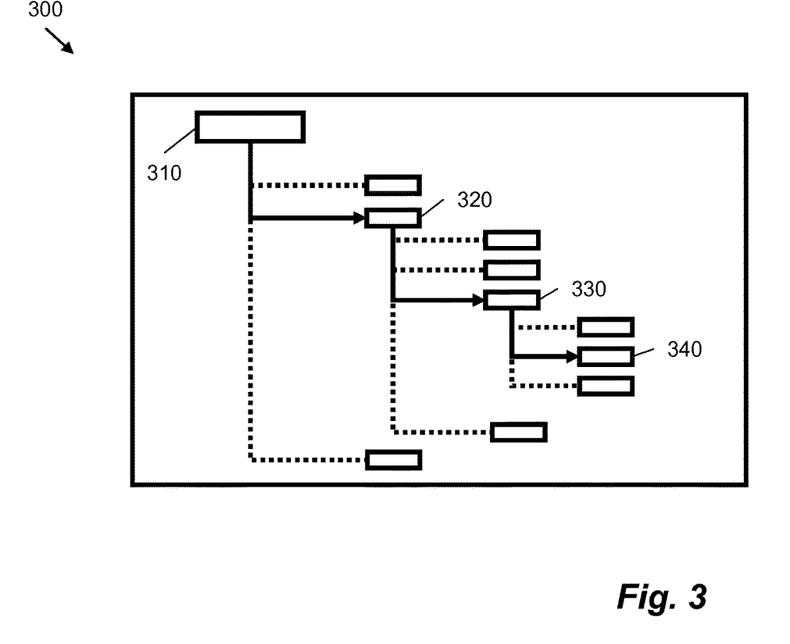
FIG. 3 is a schematic illustration showing a structure of a build material profile according to an example.

FIG. 3 shows an example of a selection of build material profile data 340 from a file tree 300 of individual build material profiles which may be used in conjunction with the controller 220 in FIG. 2. Build material profile data 340 may comprise a number of individual parameters which may be conveniently stored on storage device 270. As an example, the build material corresponding to build material profile data 340 may be chosen from a sub-category 330 of build material profiles 330 sharing a common parameter, such as "plastics" or "metals" which itself may be chosen from a sub-category of build material profiles 320. Category 320 may, for example be a sub-category of build materials introduced by the manufacturer of a build material and/or relate to parameter values that are constant across the set of build materials in the sub-category. Category 320 may itself comprise a sub-category of "build material profiles" 310.

In one example, the file tree may be updated and maintained remotely by a third-party provider or may be maintained locally, e.g. locally to one or more of the controller 220 and an additive manufacturing system that uses control data 280. In further examples, access to separate categories of build material profile data may be provided both remotely and locally as a computer file or within an embedded memory of an additive manufacturing system. In one case, the apparatus 200 may form part of an additive manufacturing system; in another case, it may be provided separately, for example it may be implemented by a production driver in a computer device. The build material profile may be selected automatically by a controller 220 such as that shown in FIG. 2 or may be selected by a user. Once the profile data 340 has been accessed controller 220 may go on to generate control data 280 without further user intervention.

In certain examples, build material profile data for a selected build material comprises parameter values for, amongst others, one or more of the following parameters: a preheat temperature for the selected build material to be used in one or more layers; a fusing energy to be delivered per unit area of a layer of the selected build material, for example this may be provided as a combination of power and speed of application of an energy source; a required heat time for the selected build material; a layer thickness for the selected build material; a speed of distribution for a layer of the selected build material. Parameter values may also relate to a halftoning strategy that may be distinguished for different regions of an object to be generated, e.g. for an inner body and an outer shell region.

Figure 4:
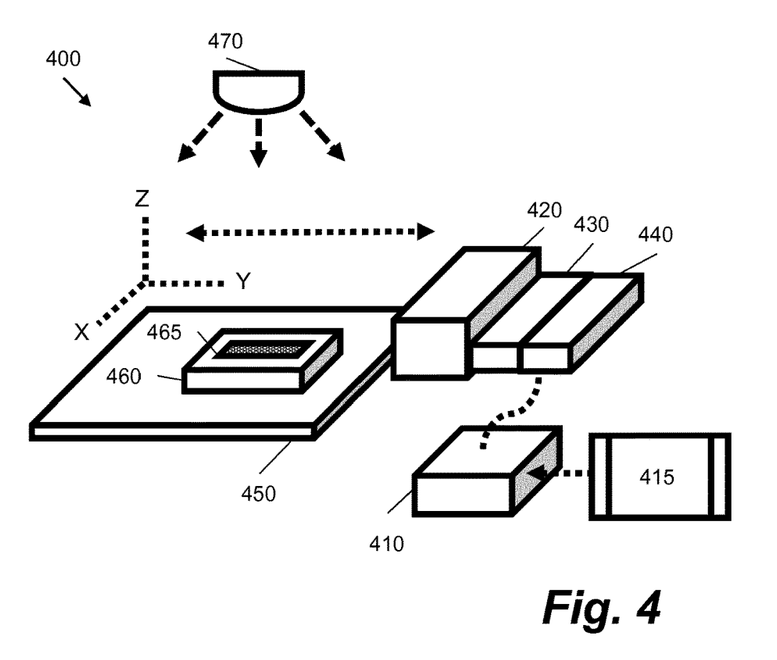
FIG. 4 is a simplified isometric illustration of an additive manufacturing system according to an example.

FIG. 4 shows a simplified isometric illustration of an additive manufacturing system 400 according to an example. This system 400 may be used to apply the process shown in FIGS. 1A to 1C and may be arranged to receive control data 280 generated by the apparatus 200 of FIG. 2.

The system 400 comprises a system controller 410 that controls the general operation of the additive manufacturing system 400. In this example the system controller 410 is arranged to receive control data 415. This may comprise control data 280 from FIG. 2. Alternatively, system controller 410 may incorporate the controller 220 of FIG. 2, in which case it may also comprise interface 210 and be arranged to receive object data. This may be, for example, for case if the additive manufacturing system is a stand-alone system.

In FIG. 4, the systems controller 410 is arranged to control the actions of one or more of a build material distributor 420, a coalescing agent distributor 430 and a coalescence modifier agent distributor 440. Suitable build material distributors may include, for example, a wiper blade and a roller. One or more additional material and/or agent distributors may also be provided. Through control of these distributors at least one or more build materials and one or more agents may be deposited on either a support structure 450 or previously deposited layers of a build material. In FIG. 4, a layer of build material 460 is shown that has an area smaller than that of the support structure; this is for ease of illustration, in an implementation a layer may have any area up to an area equal to the area of the support structure 450. Similar to FIG. 1C, the previously deposited layers of a three-dimensional object typically comprise portions of uncoalesced build material and portions of coalesced build material 465. The relative proportions of coalesced and uncoalesced build material depend on the object being generated. In certain cases, portions of uncoalesced build material in any given layer provide support for subsequent layers of build material, e.g. as distributed by build material distributor 420. For example, during production each layer may have a common area, such that the object is built within a cubic volume. At the end of production the uncoalesced build material may be removed, e.g. manually or mechanically, to reveal the portions of coalesced build material that form the object.

For example, the coalescing agent distributor 430 may be arranged to receive instructions from the system controller 410 and to selectively deliver the coalescing agent onto portions of a layer of the at least one build material in accordance with the control data 415. Similarly, the coalescence modifier agent distributor 440 may be arranged to receive instructions from the systems controller 410 and to selectively deliver the coalescence modifier agent onto portions of a layer of the at least one build material in accordance with the control data 415. The build material distributor 420 may be arranged to provide a first layer of at least one build material, and to provide subsequent layers of at least one build material on a previously provided layer. As described above each layer may have a common area and a defined thickness. A subsequent layer of build material may thus be deposited on a previous layer where both layers have the same thickness and area. The thickness may be defined in the build material profile. An energy source 470 is also provided that applies energy to deposited layers 460 on the support structure 450. The energy source may apply a uniform level of energy to the deposited layers 460 and/or may comprise an addressable and/or directable energy source, such as a laser. As such the coalescing agent and the coalescence modifier agent provide selective coalescence of the build material when the energy source 470 is applied to a layer of at least one build material during the production of the three-dimensional object according to the control data 415.

In one case at least the agent distributors 430 and 440 may comprise printheads, such as thermal printheads or piezo inkjet printheads. One or more of the support structure 450 and the distributors 420 to 440 may be arranged to move in one or more dimensions. As such build materials and/or agents may be applied to addressable locations in three-dimensions. In one implementation, the build material distributor 420 may be arranged to provide a layer of build material having a layer thickness in the range of about 90 to 110 microns, and wherein the agent distributors may be arranged to provide drops of agent of about 10 Pico liters per drop.

In certain implementations, a build material supply may be provided adjacent to the support structure 450. This build material supply may be moveable to expose a volume of build material. The volume of build material may then be distributed across the support structure 450 by way of the build material distributor 420; for example if the build material distributor 420 is a wiper the volume of build material may be wiped across the support structure 450 to form a layer of build material.

In one case, a build material supply may comprise a storage medium configured to store data for use in identifying a build material provided by the build material supply. For example, a build material supply may comprise an electronic circuit or chip storing a build material identifier. This build material identifier may be transmitted, through one or more of wired and wireless transmission, to one or more of the interface 250 of FIG. 2 and the systems controller 410 of FIG. 4. For example, in this case the selection data 250 may be indicative of a build material available via the build material supply, e.g. by way of a transmitted build material identifier. In this manner a controller, either 220 or 410, may be arranged to automatically retrieve build material profile data for a build material available in a build material supply. In another case build material profile data may be stored directly on the circuit or chip, which may be read by the additive manufacturing system.

In certain cases, the one or more parameters of the build material profile data comprise, for a given build material, an indication of a proportion of uncoalesced build material to be distributed by the build material distributor. For example, a given build material may only provide satisfactory object properties when no more that 30% recycled build material is used. This may be because contamination by a coalescence modifier agent may change the chemical properties of used build material, e.g. material as found in portions 170 of FIG. 1. Such contamination may prevent coalescence at proportions of over 30%. Control data, such as control data 280 shown in FIG. 2, generated according to build material profile data for a selected build material may thus limit the amount of recycled build material that is mixed with "new" build material.

In one case, build material may be mixed on a remixing station. In this case, the mixing may be performed independently of production of a three-dimensional object. For example, a mixing station may have access to a quantity of used or recycled build material from system 400, together with a quantity of "new" or fresh build material. The mixing station may then control the selective supply of the used and new build material to produce a build material mix of a predefined proportion for use as a build material as described above. In one case, the mixing station may be coupled to the system 400 so as to supply the build material mix; for example, build material mix may be supplied via a build material supply. A storage medium associated with the build material supply, e.g. an electronic circuit or chip as previously discussed, may comprise data that indicates the proportion of used and new build material, e.g. as well as a build material identifier. This proportion may be used to retrieve and/or adjust suitable build material parameter values from the build material profile.

Figure 5:
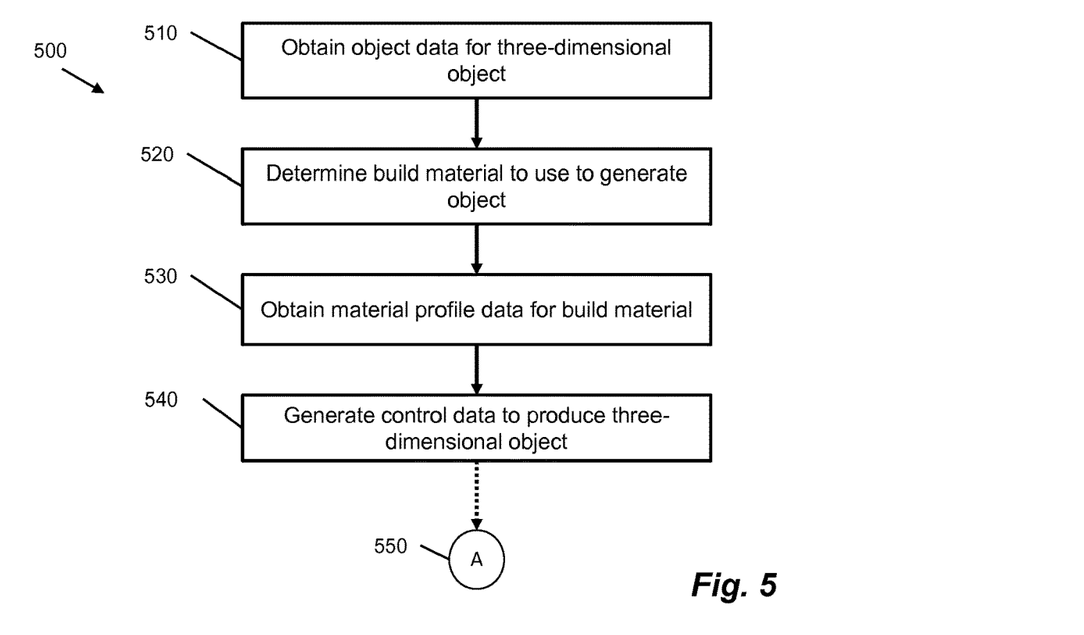
FIG. 5 is a flowchart showing a method of generating control data according to an example.

FIG. 5 shows a method 500 for generating control data to produce a three-dimensional object according to an example, which may be used in conjunction with the exemplary system of FIG. 4.

At block 510, object data is obtained that is representative of the three-dimensional object to be generated. In one case, the object data comprises one or more parameters relating to an object design such as the shape and size of the object. In certain cases, the object data may also comprise object property data relating to one or more properties of the object, e.g. one or more specified material properties.

At block 520, build materials to be used to generate the object are determined. The build materials may be determined automatically or may be selected by a user. In one case, an object may comprise separate build materials for different portions of the object. The build materials may be indicated in the object data and/or may be indicated by selection data as described with reference to FIG. 2.

At block 530, build material profile data is obtained for each build material determined at block 520. This may comprise, amongst others, accessing profile data from a tree such as that shown in FIG. 3, accessing one or more files storing build material profiles for one or more build materials and/or retrieving build material profile data from a local or remote database. In certain cases, block 530 may comprise generating a new build material profile for a new build material, for example, supplying a new build material file or entering build material profile data to generate a new build material profile. In certain cases build material profile data may be requested from a storage device or supply service based on one or more build material identifiers retrieved from an additive manufacturing system, e.g. from one or more build material containers removably installed in the system.

The build material profile data obtained at block 530 defines one or more parameter values that are dependent on properties of a given build material and that are configured to generate a three-dimensional object with predefined build properties, e.g. nominal or minimal structural properties. In one case, at least one parameter value relates to an interaction of a coalescence modifier agent and the given build material, the coalescence modifier agent being used to modify coalescence of the given build material in the production of the three-dimensional object as described with relation to FIGS. 1A to 1C and FIG. 4. In one case, the one or more parameter values comprise at least a quantity of a coalescing agent to be used for a unit volume of the given build material and a quantity of the coalescence modifier agent to be used for a unit volume of the given build material.

At block 540, control data for use in controlling an additive manufacturing system is generated according to the obtained object data and the obtained build material profile data. This may comprise applying data from one or more build material profile files to data from an object file to determine configuration parameters for the additive manufacturing system. This data may be generated by a controller such as those shown in one or more of FIGS. 2 and 4. The control data may further comprise data that defines patterns of coalescence agent and coalescence modifier agent to be used at a region of the build material, e.g. in accordance with the dimensions of the object as defined in the object data and the properties of one or more build materials as defined in the obtain build material profile data. The generated control data may also further comprise parameter values such as timings and quantities of the respective agents on a layer of build material to achieve a set of desired properties in a produced three-dimensional object. The control data may be stored for subsequent use by an additive manufacturing system, e.g. at a later point in time, or it may be passed to an additive manufacturing system for the production of the object.

Figure 6:
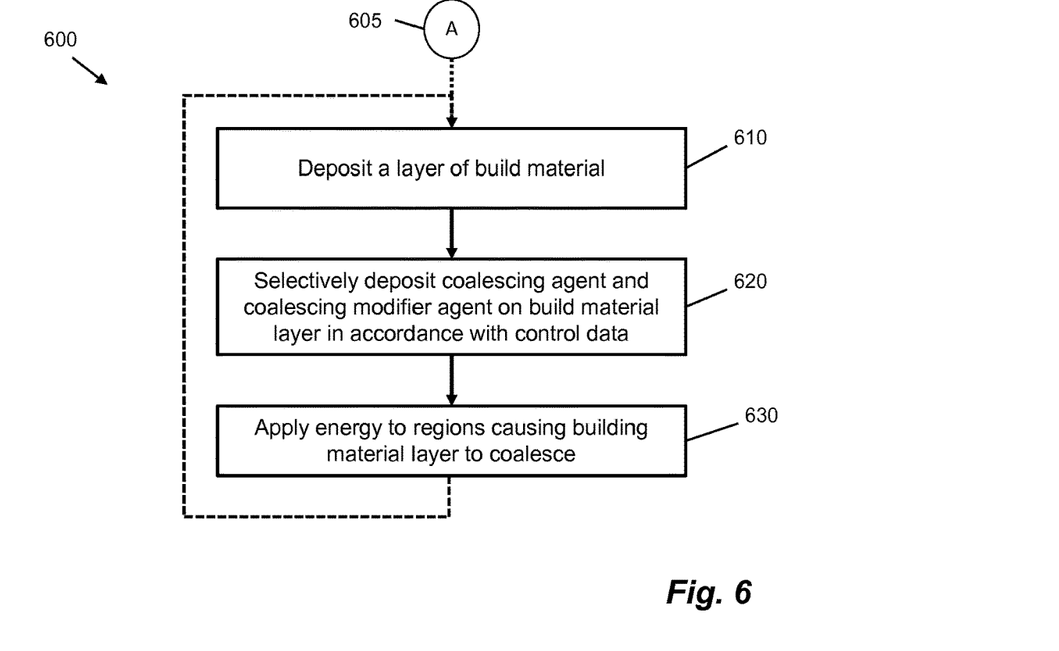
FIG. 6 is a flowchart showing a method of producing a three-dimensional object according to an example.

FIG. 6 shows a method 600 of generating a three-dimensional object according to an example. This method uses the control data generated by the method 500 of FIG. 5. The method 600 may be applied using the system 400 of FIG. 4.

The method 600 of FIG. 6 begins at stage 605. In certain cases stage 605 is equal to stage 550 of FIG. 5, i.e. the method 600 represents a continuation of FIG. 5. In other cases, the method 600 may use control data from FIG. 5 but may be applied at a later point in time, e.g. based on stored and/or received control data.

At block 610, a layer of build material is formed. At block 620 a coalescing agent and a coalescence modifier agent are selectively deposited on regions of the one or more build materials in accordance with the control data. At block 630, energy is applied to regions of the layer. This results in material coalescence on the portions of the build material on which the coalescing agent has been deposited. For example, as described with reference to FIGS. 1A to 1C, the build material may solidify to form a portion of the three-dimensional object in accordance with where the coalescing agent and the coalescence modifier agent were deposited. In various examples of the present method, the energy applied may be an infrared source, a visible light source or an ultraviolet source. In FIG. 6, blocks 610 to 630 may be repeated, as indicated by the arrow therein, to repeatedly apply a subsequent layer on top of a layer of one or more of coalesced and uncoalesced build material. The method may be repeated until the object or a portion of the object has been generated.

In certain examples, build material from a previous layer may not coalesce due to the absence of a deposited coalescing agent and/or the presence of a deposited coalescence modifier agent. In these cases a quantity of coalescence modifier agent may be present in residual build material, such as in portion 170 of FIG. 1. It may be desired to reuse this residual build material, for example in subsequent production runs on one or more additive manufacturing systems. As described previously, to reuse build material in certain cases it may be necessary to calibrate the system and consequently generate control data for a layer based on the composition of the build material to obtain the desired build quality of the object. For example, parameters values relating to quantities of coalescence agent and coalescence modifier agent per part unit volume may be modified by a controller such as controller 440 shown in FIG. 4 to take reused build material into account. This has the advantage of maintaining a build quality throughout the manufacturing process. In one example this process may be repeated at every production cycle In certain examples, the one or more parameters of the build material profile data may comprise, for a given build material, an indication of a proportion of uncoalesced build material to mix with new build material to form a build material mix. In this case, the method 600 may comprise mixing, in accordance with the build material profile, uncoalesced build material and new build material to form a build material mix and depositing a layer of the build material mix, e.g. as a subsequent layer of build material. In one case this mixing may be performed offline, e.g. independently of any one particular production run.

Similarly, the one or more parameter values may comprise a maximum amount of the coalescence modifier agent to be used for a unit volume of the given build material. In this case method 600 may comprise determining a proportion of reused build material in a given build material mix, determining an amount of coalescence modifier agent that has been applied to the reused build material and adjusting an instructed amount of coalescence modifier agent to be used for a unit volume of the given build material in the control data according to the proportion of reused build material, the amount of coalescence modifier agent that has been applied to the reused build material and the maximum amount of the coalescence modifier agent to be used.

Certain examples described herein may be used in additive manufacturing systems that use inkjet printheads to deposit one or more agents onto powder build material to generate a three-dimensional object using a layer-by-layer construction method. Although this particular additive manufacturing system is presented as an example, the examples described above may be applied to other additive manufacturing systems including, amongst others, selective laser sintering systems, stereo lithography systems, inkjet systems, any three-dimensional printing system, inkjet deposition systems and laminated object manufacturing systems.

Certain examples store build material properties in a build material profile that enables an additive manufacturing system to be configured, and/or preconfigured, according to one or more build materials that are to be used. This material profile describes a set of parameters that are required to properly produce a three-dimensional object with one or more available raw materials. The build material profile may comprise values for data such as the melting point of a build material or the coalescing properties of the build material. Although certain parameters have been described as examples herein, they are not intended to provide an exhaustive list of parameters that may form part of a build material profile. As such the parameter values that are stored as part of a material profile may vary depending on the specifics of the additive manufacturing system being employed. Through use of build material profiles correct and/or optimum parameter values may be applied for each build material.

In one case, object property data may be provided as part of object data 230 and/or the object data obtained in block 510. This object property data may define one or more desired object properties for the three-dimensional object to be generated. In one case, the object property data 180 may comprise desired material properties for at least a portion of the object to be generated. Object property data 180 may be defined, for example, for the whole of an object to be generated, e.g. global property data, or for one or multiple portions of an object to be generated, e.g. local property data. The object property data 180 may also be used to define multiple object properties for a portion or portions of an object. Object properties may include, for example, flexibility, elasticity, rigidity, surface roughness, porosity, interlayer strength, density, and the like, and may depend on the type of build material or agents used to generate an object. Given this object property data a controller, such as controller 220 or 410 may process build material profile data and object model data so as to effect the specified object properties in a generated three-dimensional object. For example, the controller may apply a function to, modify and/or select particular parameter values from the build material profile data so as to effect the specified object properties.

Certain examples described herein may enable a set of, and in certain cases all, image processing and/or production parameters to be combined in a single file. In this case image processing parameters may relate to halftoning parameters. In one case, a material profile may be selected automatically by an additive manufacturing system, e.g. based on available build materials. In another case, a user may select a particular build material, a particular amount of build material and/or a desired proportion of build material reuse and the appropriate parameter values may be applied based on corresponding build material profile data.

According to certain examples described herein a set of build material profiles may be supplied by a manufacturer of an additive manufacturing system and/or by build material suppliers. If use of a new raw material is desired, a user may generate a new set of parameter values in a custom build material profile that may be used in the apparatus and methods described herein. Build material profiles may also be communicated between additive manufacturing systems, e.g. to share a given profile between a set of production machines and/or to share a custom profile that has been configured and tested on a particular additive manufacturing system. In certain cases material profiles may also be communicated over a network such as the Internet.

Figure 7:
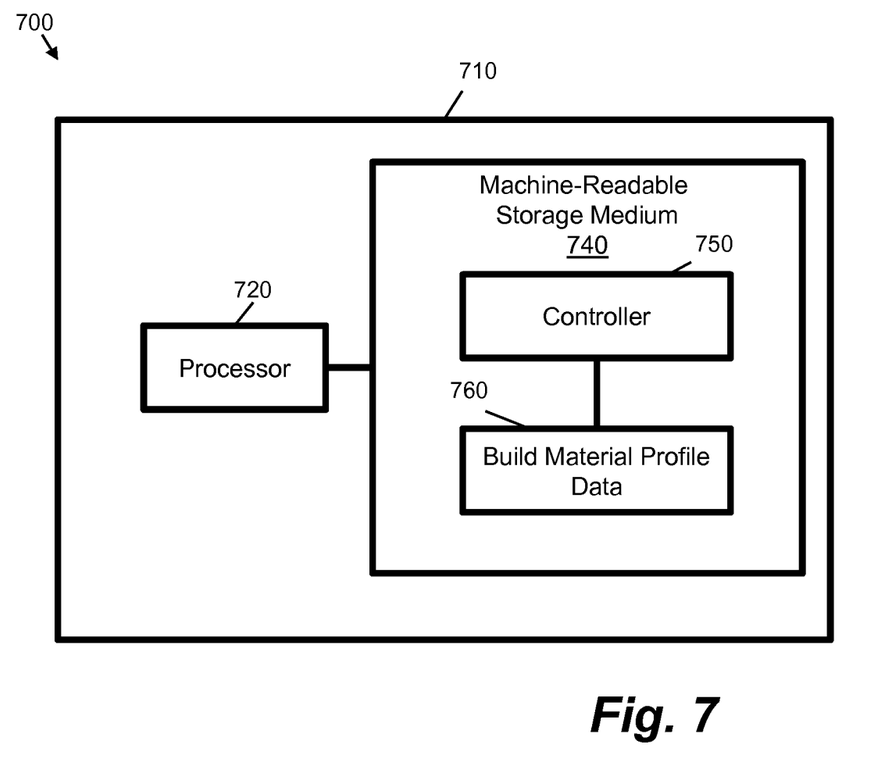
FIG. 7 is a schematic diagram showing an exemplary processing system according to an example.

Certain methods and systems as described herein may be implemented by a processor that processes program code that is retrieved from a non-transitory storage medium. For example, this may be used to implement at least controller 220 or controller 410. FIG. 7 shows an example 700 of a device comprising a machine-readable storage medium 740 coupled to a processor 720. The device may comprise a computer and/or an additive manufacturing device. Machine-readable media 740 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In the example of FIG. 7, the machine-readable storage medium comprises program code to implement a controller 750 as in the foregoing examples described herein, and data representative of one or more build material profile data 760. In other examples, the build material profile data 760 may be stored in a separate storage medium, e.g. as described with reference to FIG. 2.

Similarly, it should be understood that a controller may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other control circuitry. The chip or chips may comprise circuitry (as well as possibly firmware) for embodying at least a data processor or processors as described above, which are configurable so as to operate in accordance with the described examples. In this regard, the described examples may be implemented at least in part by computer program code stored in (non-transitory) memory and executable by the processor, or by hardware, or by a combination of tangibly stored code and hardware (and tangibly stored firmware).

The preceding description has been presented to illustrate and describe examples of the principles described. This description is not intended to be exhaustive or to limit these principles to any precise form disclosed. Many modifications and variations are possible in light of the above teaching.

What is claimed is:

1. An apparatus comprising:
an interface to receive object data for a three-dimensional (3D) object to be generated, and selection data indicating a build material to be used to build the 3D object; and
a controller to:
access build material profile data for the build material indicated in the selection data, wherein the build material profile data for the build material defines one or more parameter values that are dependent on properties of the build material and that are configured to generate the 3 D object with predefined build properties, and wherein the one or more parameter values comprise a parameter value relating to an interaction of a coalescence modifier agent and the build material, the coalescence modifier agent to modify coalescence of the build material in the building of the 3D object,
determine a proportion of a reused build material and a new build material in a build material mix for use in building the 3D object, the reused build material comprising a build material from a previous build operation, and
generate control data for the building of the 3D object based on the object data, the build material profile data, and the determined proportion of the reused build material and the new build material in the build material mix.

2. The apparatus of claim 1, wherein the reused build material of the build material mix comprises a previously-used, uncoalesced build material.

3. The apparatus of claim 1, wherein the one or more parameter values comprise a quantity of a coalescing agent to be used for a unit volume of the build material and a quantity of the coalescence modifier agent to be used for the unit volume of the build material.

4. The apparatus of claim 3, comprising:
a first agent distributor to receive the control data from the controller and to selectively deliver the coalescing agent onto portions of a layer of the build material in accordance with the control data;
a second agent distributor to receive the control data from the controller and to selectively deliver the coalescence modifier agent onto portions of the layer of the build material in accordance with the control data; and
a build material distributor to provide a first layer of the build material, and to provide a subsequent layer of the build material on the first layer,
wherein the coalescing agent and the coalescence modifier agent provide selective coalescence when an energy source is applied to a layer of the build material during the building of the 3D object according to the control data.

5. The apparatus of claim 4, comprising:
a build material supply comprising a to supply of the build material for distribution by the build material distributor,
wherein the selection data is indicative of the build material supplied by the build material supply.

6. The apparatus of claim 5,
wherein the build material supply is associated with a storage medium configured to store data for use in identifying the build material, and
wherein the stored data comprises a portion of the selection data.

7. The apparatus of claim 1, wherein the one or more parameter values comprise one or more of, for the build material:
a quantity of the coalescence modifier agent to be used for a unit volume of the build material;
a radius of the coalescence modifier agent to be used for the build material;
a quantity of uncoalesced build material to be used in the build material mix for the build material;
a number of passes for a distribution of the coalescence modifier agent for a layer of the build material; and
a temperature to be applied to one or more uncoalesced areas of a layer of the build material.

8. The apparatus of claim 7, wherein the one or more parameter values further comprise one or more of, for the build material:
a preheat temperature for the build material to be used in one or more layers;
a fusing energy to be delivered per unit area of a layer of the build material;
a required reheat time for the build material;
a layer thickness for the build material; and
a speed of distribution for a layer of the build material.

9. The apparatus of claim 1, wherein the generating of the control data comprises using a function to modify, based on the determined proportion, the parameter value relating to the interaction of the coalescence modifier agent and the build material.

10. The apparatus of claim 9, wherein the function is stored in a storage medium and is accessible by the controller.

11. The apparatus of claim 9, wherein the function is defined in the build material profile data.

12. The apparatus of claim 1, wherein the build material profile data comprises different parameter values relating to the interaction of the coalescence modifier agent and the build material for respective different proportions of the reused build material and the new build material in the build material mix for use in building the 3D object, and the controller is to:
select, from among the different parameter values based on the determined proportion, the parameter value relating to the interaction of the coalescence modifier agent and the build material.

13. The apparatus of claim 1, wherein the controller is to determine a configuration of an additive manufacturing system for building the 3D object, and select, from the build material profile data, the one or more parameter values based on the configuration of the additive manufacturing system.

14. The apparatus of claim 1, further comprising:
a build material distributor to provide a layer of the build material;
agent distributors to distribute, according to the control data, a coalescing agent and the coalescing modifier agent onto portions of the layer; and
an energy source to apply energy to the layer to cause portions of the build material to coalesce and solidify to form a portion of the 3D object in accordance with where the coalescing agent and the coalescing modifier agent were deposited onto the layer.

15. The apparatus of claim 1, wherein the build material is of a build material type and the one or more parameter values are indicative of one or more of chemical and physical properties of the build material type.

16. A method comprising:
receiving, by a controller, object data for a three-dimensional (3D) object to be generated, and selection data indicating a build material to be used to build the 3D object;
accessing, by the controller, build material profile data for the build material indicated in the selection data, wherein the build material profile data for the build material defines one or more parameter values that are dependent on properties of the build material and that are configured to generate the 3D object with predefined build properties, and wherein the one or more parameter values comprise a parameter value relating to an interaction of a coalescence modifier agent and a coalescence agent for coalescing the build material, the coalescence modifier agent to modify coalescence of the build material in the building of the 3D object;
determining, by the controller, a proportion of a reused build material and a new build material in a build material mix for use in building the 3D object, the reused build material comprising a build material from a previous build operation; and
generating, by the controller, control data for the building of the 3D object based on the object data, the build material profile data, and the determined proportion of the reused build material and the new build material in the build material mix.

17. The method of claim 16, wherein the one or more parameter values comprise a quantity of the coalescing agent to be used for a unit volume of the build material and a quantity of the coalescence modifier agent to be used for the unit volume of the build material.

18. The method of claim 16, wherein the generating of the control data comprises using a function to modify, based on the determined proportion, the parameter value relating to the interaction of the coalescence modifier agent and the coalescence agent for coalescing the build material.

19. The method of claim 18, wherein the function is stored in a storage medium and is accessible by the controller.

20. The method of claim 18, wherein the function is defined in the build material profile data.

21. The method of claim 16, wherein the build material profile data comprises different parameter values relating to the interaction of the coalescence modifier agent and the coalescence agent for coalescing the build material for respective different proportions of the reused build material and the new build material in the build material mix for use in building the 3D object, the method further comprising:
selecting, by the controller from among the different parameter values based on the determined proportion, the parameter value relating to the interaction of the coalescence modifier agent and the build material.

22. A non-transitory machine-readable storage medium comprising instructions that upon execution cause a system to:

receive object data for a three-dimensional (3D) object to be generated, and selection data indicating a build material to be used to build the 3D object;

access build material profile data for the build material indicated in the selection data, wherein the build material profile data for the build material defines one or more parameter values that are dependent on properties of the build material and that are configured to generate the 3D object with predefined build properties, and wherein the one or more parameter values comprise a parameter value relating to an interaction of a coalescence modifier agent and a coalescence agent for coalescing the build material, the coalescence modifier agent to modify coalescence of the build material in the building of the 3D object;

determine a proportion of a reused build material and a new build material in a build material mix for use in building the 3D object, the reused build material comprising a build material from a previous build operation; and generate control data for the building of the 3D object based on the object data, the build material profile data, and the determined proportion of the reused build material and the new build material in the build material mix.

23. The non-transitory machine-readable storage medium of claim 22, wherein the generating of the control data comprises using a function to modify, based on the determined proportion, the parameter value relating to the interaction of the coalescence modifier agent and the coalescence agent for coalescing the build material.

24. The non-transitory machine-readable storage medium of claim 23, wherein the function is stored in a storage medium and is accessible by the controller, or the function is defined in the build material profile data.

25. The non-transitory machine-readable storage medium of claim 22, wherein the build material profile data comprises different parameter values relating to the interaction of the coalescence modifier agent and the coalescence agent for coalescing the build material for respective different proportions of the reused build material and the new build material in the build material mix for use in building the 3D object, and the instructions upon execution cause the system to:

select, from among the different parameter values based on the determined proportion, the parameter value relating to the interaction of the coalescence modifier agent and the coalescence agent for coalescing the build material.

* * * * *

UNITED STATES PATENT AND TRADEMARK OFFICE
CERTIFICATE OF CORRECTION

PATENT NO. : 10,452,038 B2
APPLICATION NO. : 15/111731
DATED : October 22, 2019
INVENTOR(S) : David Ramirez Muela et al.

Page 1 of 1

It is certified that error appears in the above-identified patent and that said Letters Patent is hereby corrected as shown below:

In the Claims

In Column 14, Line 29, in Claim 1, delete "3 D" and insert -- 3D --, therefor.

In Column 15, Line 5, in Claim 5, delete "a to" and insert -- a --, therefor.

In Column 16, Line 10, in Claim 15, delete "build" and insert -- given build --, therefor.

In Column 16, Line 12, in Claim 15, delete "build" and insert -- given build --, therefor.

Signed and Sealed this
Twenty-fourth Day of December, 2019

Andrei Iancu
*Director of the United States Patent and Trademark Office*